Jan. 5, 1932. B. W. FREEMAN 1,839,544
SHOE ORNAMENTING DEVICE FOR SHOE ORNAMENTING MACHINES
Filed Dec. 19, 1928 3 Sheets-Sheet 3
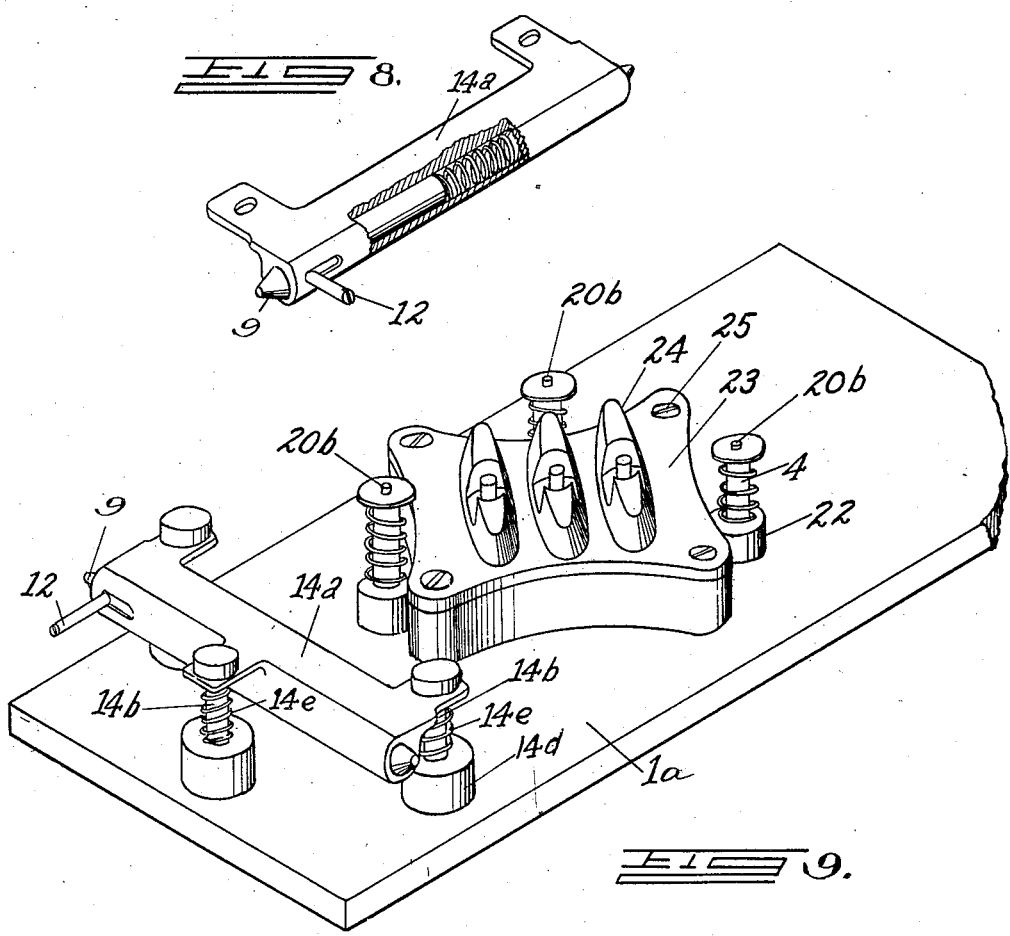
INVENTOR.
Benjamin W. Freeman
BY
ATTORNEYS Patented Jan. 5, 1932

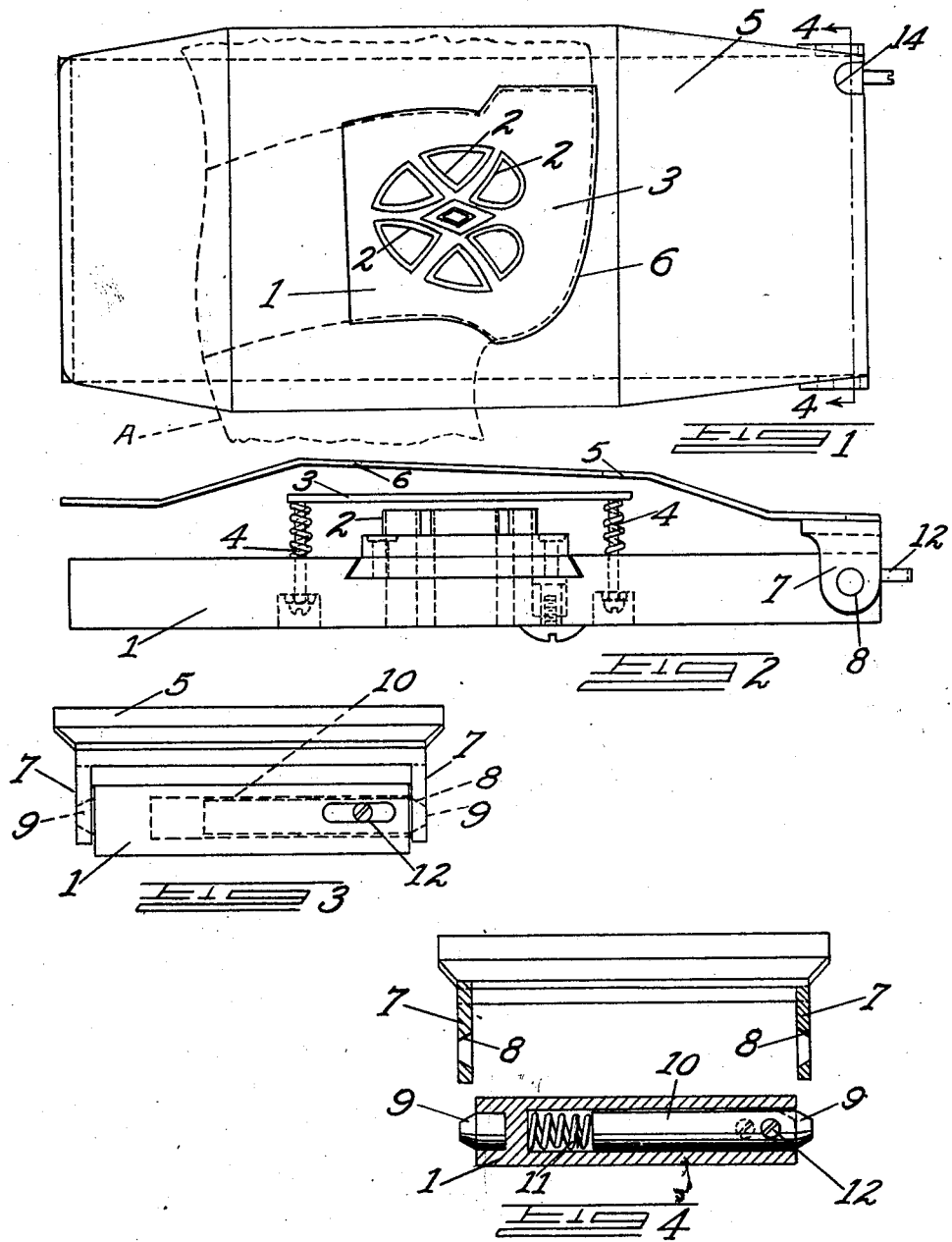

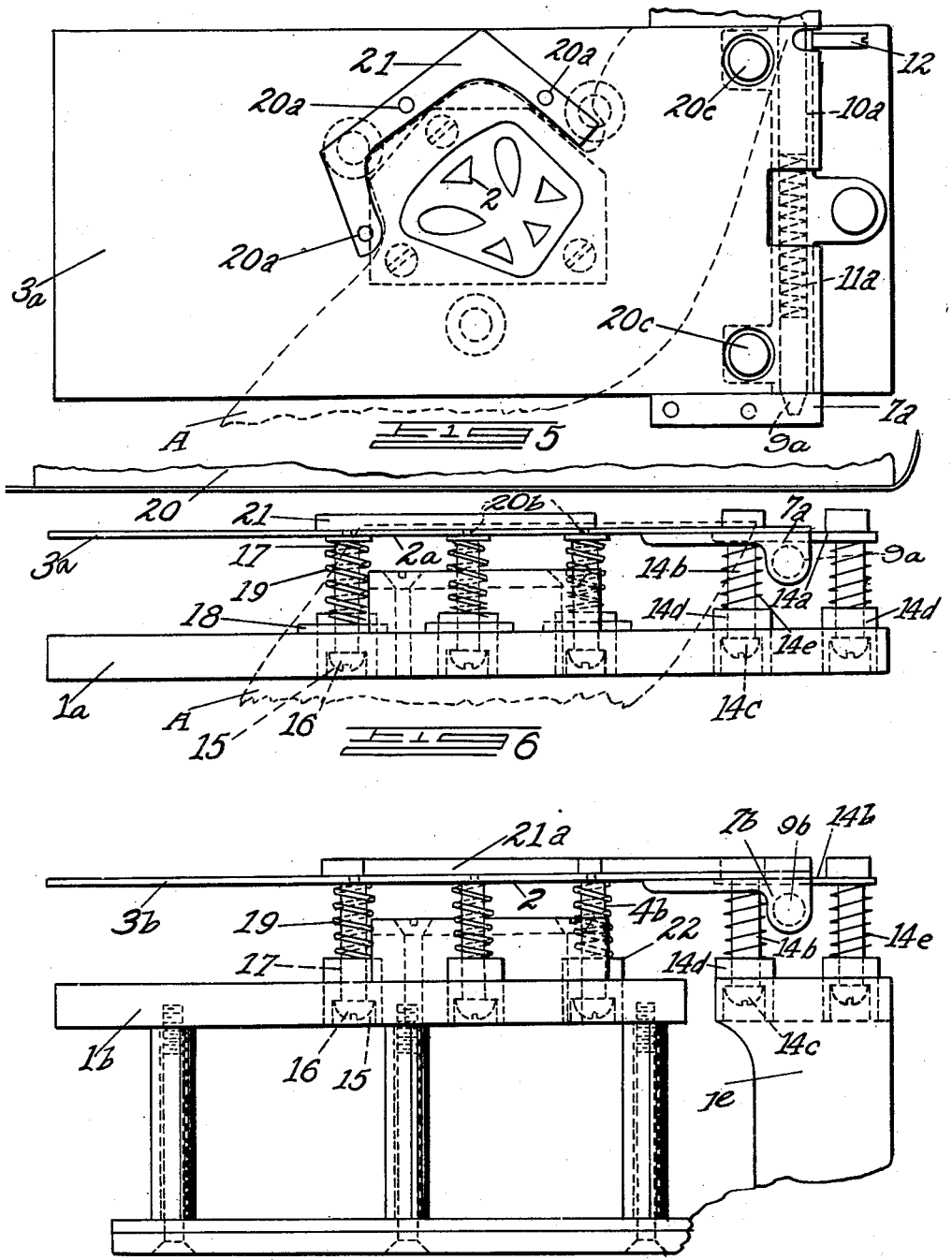

1,839,544

UNITED STATES PATENT OFFICE

BENJAMIN W. FREEMAN, OF CINCINNATI, OHIO

SHOE ORNAMENTING DEVICE FOR SHOE ORNAMENTING MACHINES

Application filed December 19, 1928. Serial No. 327,072.

My invention relates to detachable mountings for devices for holding work in combination with a support therefor in a shoe ornamenting machine.

In my Patent No. 1,681,033, of August 14, 1928, I have disclosed a cut-out machine which has become known in the trade as such, and for purposes of illustrating one adaptation of the invention disclosed herein I have illustrated my novel ornamenting device in combination with such a machine. Further in my co-pending application Serial No. 206,966, filed July 19, 1927, I have illustrated a work support with gauging and work holding means provided with a quickly detachable mounting on the work support. I have illustrated my novel work holding device associated in a similar relationship, although the structure is adaptable for use with many other types of beds and supports. In my co-pending application heretofore referred to the work holding means is mounted in a groove in the upper face of a supporting plate and requires a tool or instrument to operate a releasing pin. Other mountings have also been suggested which require the movement of a pin in the detachment of the work holding means. Such detachable mountings are awkward to manipulate and the parts required are easily lost and damaged so as to require frequent replacement, and the result is poor work. Further, unless means are provided to take up the wear after the parts are loose bad work and work not properly ornamented results.

It is the object of my invention to provide a work holding device provided with mounting means permitting its quick detachment from a bed or support in which the location of the detachable connection is so positioned that it may be readily and quickly detached without the necessity of manipulating with the upper surface of the support or other member to which the device may be attached.

In my co-pending application Serial No. 206,966, above referred to, a work holder or mask is mounted on a hinge, one leaf of which is provided with a rib which engages a slot in the upper surface of a supporting plate. A spring pin is provided to lock the leaf in position. As noted, the structure requires a pointed instrument to release the hinge in order to bring about the detachment of the mask. I have found that it is preferable, from the point of view of accessibility, not to have the attachment for the mask associated with or extending through the upper surface of the supporting plate. When the stripper plate, which is ordinarily associated with this type of shoe ornamenting device, is of considerable size, it interferes with the ready removal of the mask. I have also found that hinged strippers become loosened with wear and so after a time do not properly align with the work or cutting instrumentalities.

It is one of my objects. therefore, to provide a demountable attachment for a mask, gauge or stripper plate and its support which will not be associated with or extend through the upper surface of the support, and which will not require the removal or displacement of a pin, but which may be manually manipulated without removal of any of the parts of the mounting. It is also an object to provide means for maintaining the proper alignment of the mask, gauge or stripper and also prevent any looseness due to wear in the connection between the parts. As the particular type of machine with which the several modifications described are preferably associated has a plunger platen it is an object to provide, in some cases, a resilient support which will allow for displacement by the plunger.

Specifically in the particular modification which I have illustrated, it is my object to provide a support having trunnions or cone bearings and with a mask, gauge or stripper having downturned ears provided with trunnion bearings or cone bearing housings. It is an object to provide conical tapered bearings which will be sturdy and allow considerable wear without inducing disalignment of the mask, gauge or stripper plate with relation to its respective support. Further it is my object to provide at least one of the trunnions with a spring mounting and with a manually operative handle which will permit its movement from the plane of journal engaging position so that the mask, gauge or stripper may be readily released from its respective support. A further object is the provision of a latching device for preventing inadvertent displacement of the detachable element.

While in a die or anvil for a cut-out machine, a mask may be required, in some types of ornamenting devices a stripper itself may serve the purpose of holding or supporting the work. The stripper plate may have gauging devices associated with it or gauges may be mounted independently on a support. In other cases a stripper may be used in combination with either a mask or gauge or both.

I will refer, in the description and claims which follow, to an improved detachable mounting for a work holding device or for means for assisting in the proper positioning of work, it being my purpose to include in this classification a plate or member associated with a support whether this member serves the purpose of a mask for holding the work from above, a stripper for holding the work from below, or a gauging device or combinations of members having the functions of assisting in the locating of work with relation to the ornamenting instrumentalities of the device.

The above and other objects to which reference will be made in the ensuing description I accomplish by that certain combination and arrangement of parts of which I have shown a preferred modification.

Referring to the drawings:—

Figure 1 is a plan view of a support with a mask shown associated therewith in accordance with my invention.

Figure 2 is a side elevation of the parts shown in Figure 1.

Figure 3 is an end elevation of the parts shown in Figures 1 and 2.

Figure 4 is a sectional view taken along the lines 4—4 in Figure 1 with the parts shown disassociated and shortly prior to the attachment of the mask to the support.

Figure 5 is a plan view of a support on which ornamenting dies are mounted in which a stripper plate carrying a gauging device is demountably secured to the support.

Figure 6 is a side elevation of the combination shown in Figure 5.

Figure 7 is a side elevation of a further modification in which a gauge plate is demountably secured on the support, the stripper plate in this instance being disassociated with the gauging device.

Figure 8 is a perspective view of the preferred trunnion type of detachable mounting device removed from the supporting plate.

Figure 9 is a perspective view of the support with the detachable mounting illustrated in Figure 10 combined therewith.

Referring first to the combination shown in Figures 1 to 4, I have indicated at 1 the supporting plate, which, in the preferred type of cut-out machine to which I have referred, is mounted so that clearance may be had for inserting a closed upper, such as is indicated at A, over or about the work support and cutting die assembly. I have indicated the cutting dies at 2 with a stripper plate 3 mounted on the pins 4 so that when the presser member is depressed and carries the work into engagement with the cutting dies the stripper plate will be depressed and then move back, due to spring pressure. When the presser member moves back, the plate will carry the work off the dies.

For holding the work while it is being operated on and for determining its position prior to the cutting operation I have shown the mask 5 having the cut-out portions 6 through which the work may be observed and accurately positioned either with respect to the dies or to particular points on the outer periphery of cut-out portions of the mask.

The mask has downturned ears 7 having journal openings 8 therein which are tapered from the inside outwardly as indicated in Figure 3. The support has trunnions 9 extending from its sides adjacent the ends of the support, and these trunnions are preferably cone shaped to correspond with the tapered journals of the ears. One of the trunnions 10 has a stem which is slidably mounted within a recess and with a spring 11 tending to force the stem and trunnion outwardly. For depressing the trunnion within the recess a pin or handle 12 is secured to the stem of the trunnion and this pin extends out at the back of the support so that when an operator wishes to mount or detach a mask, all that is necessary is to press on the handle until the trunnion has been moved to the position indicated in dotted lines in Figure 4. To mount the mask one of the trunnions is depressed and the ear on the opposite side is then fitted over its respective trunnion bearing and then the other ear may be positioned so that when the depressed trunnion is released it will bear within the tapered journal of its respective bearing. The mask has a cut-out portion 14 which allows the mask to clear the lug 12 when it is swung upwardly on its pivot.

Referring now to Figures 5 and 6, I have shown the supporting plate 1a having a stripper plate 3a detachably mounted on a resilient support 14a on the plate 1a, with ears 7a which engage the conical trunnions 9a. One of the trunnions is composed of an elongated rod which is slidably mounted in a recess 10a. As in the first combination described, a spring 11a presses outwardly on the rod. The stripper plate may be detached from the resilient support in the same manner as the mask, which is shown in Figures 1–4, is detached from the rigid support. The resilient support 14a may, as indicated, be composed of a plate having portions seating a plurality of pins 14b having heads 14c retained within tubular bushings 14d mounted in the plate 1a. The tubular bushings have upper ends of reduced diameter which limit the upward movement of the pins as pressed by the springs 14e. The stripper plate being flat must be sufficiently movable to yield to the downward pressure of the plunger head.

As the stripper plate shown in Figures 5 and 6 is detachably mounted I provide a spring support for the stripper on the base support 1a. The support has recesses 15 therein to slidably engage the enlarged heads 16 of pins 17 which are permanently attached to the stripper plate. Washers 18 are mounted on the pins 17 and springs 19 provide resilient means for pressing upwardly on the stripper to cause it to perform its stripping function after the plunger head indicated at 20 has pressed down on the work A, causing it to engage the ornamenting dies 2a. So that the stripper, when detachable, will occupy a proper position relative to the cutting dies, I preferably provide a series of holes or perforations 20a, as indicated in Figure 5, which register with the extended ends 20b, as most clearly shown in Figure 9, of the spring pins. Counterbalancing or balancing plugs 20c pressed upwardly by springs 20d are also provided to cause the stripper to descend in an even vertical plane without rocking. The plugs 20c are slidably retained in bushings similar to the bushings 14d.

The stripper plate 3 in Figures 5 and 6 has a plate 21 mounted thereon. The plate 21 serves as a solid gauge or guide to assist in the alignment of the shoe parts for proper ornamenting.

In Figure 7 I have shown the stripper plate 3b mounted on the support 1b with spring-pressed pins 4b in a manner similar to the stripper mounting in Figures 1–4 wherein the stripper pins are attached to the stripper. In this modification the plate 3 is mounted on an anvil type base 1c. As the support is rather thin in this instance I have provided bushings 22 which provide suitable alignment for the enlarged heads of the pins 4b.

The solid gauge plate 21a in this instance is disassociated with the stripper plate 3b having ears 7b mounted in trunnions 9b in the resilient support 14b. The general shape of the gauge 21a is the same as that shown in Figures 5 and 6, although it may be of any desired shape. Since the gauge is disassociated with the stripper the gauge may be swung upwardly on its pivot and may serve a double purpose of both gauging and holding down the work prior to the ornamenting operation.

While the tapered trunnion bearings tend to prevent misalignment of the mask with relation to the support, and this construction is preferable, other methods of demountably attaching the work holding plate to its support other than in its upper surface or extending through it, will occur to those skilled in the art.

Having thus described my invention, what I claim as new and desire to secure by Letters Patent, is:—

1. In combination with a die support for use in a shoe ornamenting machine, a work holding plate having means for mounting same on said support at the sides thereof comprising ears having journal bearings therein, and said support having trunnions extending therefrom to engage said journal bearings, said trunnions being mounted for relative movement so as to releasably retain said plate.

2. In combination with a die support for use in a shoe ornamenting machine, a work holding plate having means for mounting same on said support at the sides thereof comprising ears having journal bearings therein, and said support having trunnions extending therefrom to engage said journal bearings, and at least one of said trunnions being provided with manual means for moving same out of bearing engagement with its respective journal bearing.

3. In combination with a die support for a shoe ornamenting machine, a detachable work positioning member having conically tapered journal bearings, said support having cone shaped trunnions engaging said tapered bearings, said trunnions being movable one relative to the other in order to release same from engagement with said tapered bearings.

4. In combination with a support having cutting dies mounted thereon, a detachable mounting device for a work holding plate to be associated with said cutting dies on said support, said device comprising cone shaped trunnions, at least one of which is resiliently mounted for movement relative to the other, and a resilient support on said support for said device.

BENJAMIN W. FREEMAN.